(12) United States Patent
Rouverand et al.

(10) Patent No.: US 6,388,428 B1
(45) Date of Patent: May 14, 2002

(54) METHOD OF CHARGING A BATTERY

(75) Inventors: Christophe Rouverand, Saint Germain en Laye; Vincent Lomba, Asnieres sur Seine, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/941,746

(22) Filed: Aug. 30, 2001

(30) Foreign Application Priority Data

Aug. 31, 2000 (FR) .......................................... 00 11 116

(51) Int. Cl.$^7$ ................................ H02J 7/04; H02J 7/16
(52) U.S. Cl. ..................................................... 320/152
(58) Field of Search ................................. 320/150, 151, 320/152, 153; 455/572

(56) References Cited

U.S. PATENT DOCUMENTS

| | | | |
|---|---|---|---|
| 5,900,717 A | * | 5/1999 | Lee .............................. 320/150 |
| 6,111,389 A | * | 8/2000 | Aranovich et al. ......... 320/150 |
| 2001/0000153 A1 | * | 5/2001 | Anderson et al. ........... 320/150 |

FOREIGN PATENT DOCUMENTS

| | | |
|---|---|---|
| EP | 0 731 548 | 9/1996 |
| EP | 0 966 089 | 12/1999 |
| FR | 2 780 570 | 12/1999 |

* cited by examiner

*Primary Examiner*—Gregory Toatley
(74) *Attorney, Agent, or Firm*—Sughrue Mion, PLLC

(57) ABSTRACT

A method of charging a battery in which the end of charging is determined by detecting variations in the battery temperature includes the following steps: entering a charging mode, periodically measuring the battery temperature, measuring the variation in the battery temperature per unit time, comparing the battery temperature variation per unit time to a first threshold corresponding to variation of the ambient temperature and the battery temperature, and in this case terminating the charging mode, and to variation of only the ambient temperature, and in this case comparing the battery temperature variation per unit time to a second threshold corresponding to variation of only the battery temperature and terminating the charging mode.

8 Claims, 4 Drawing Sheets

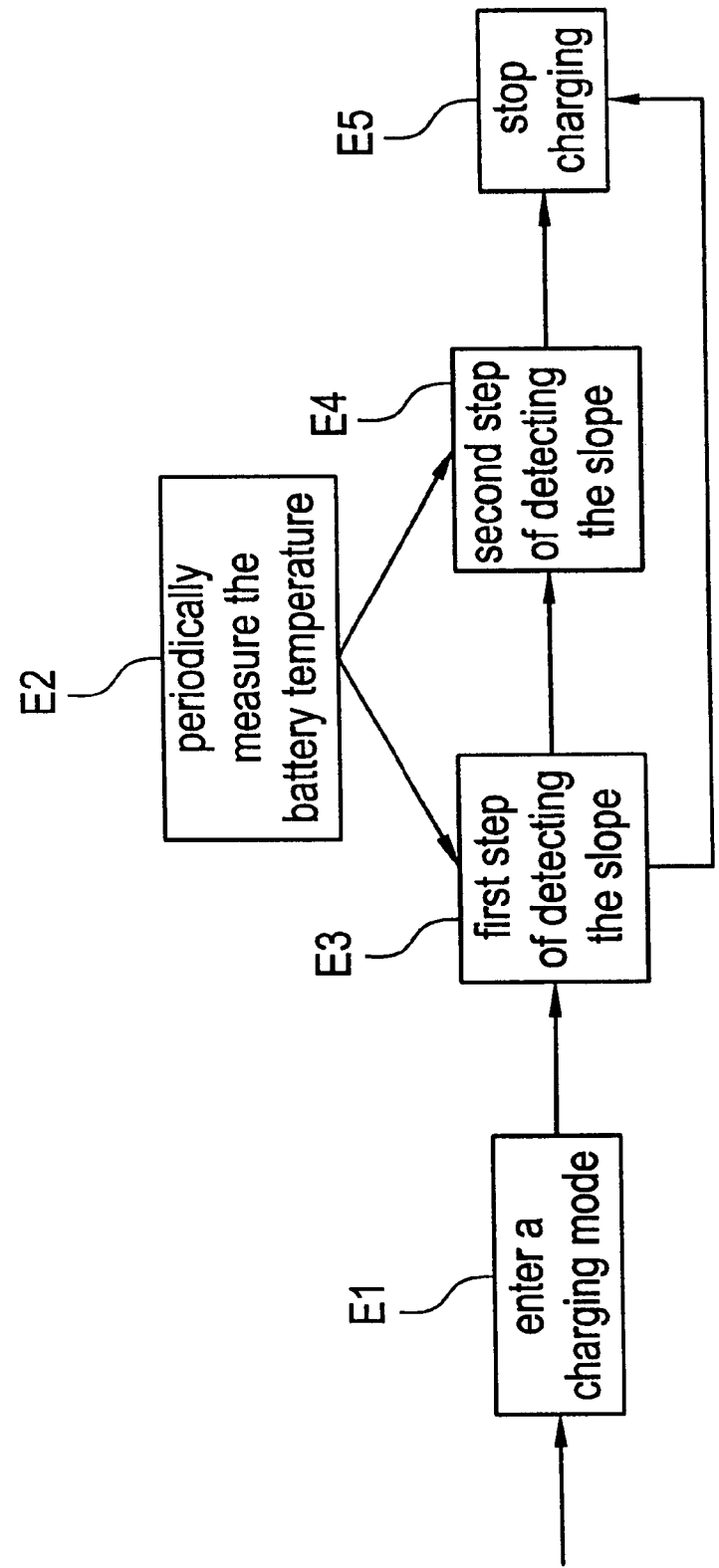

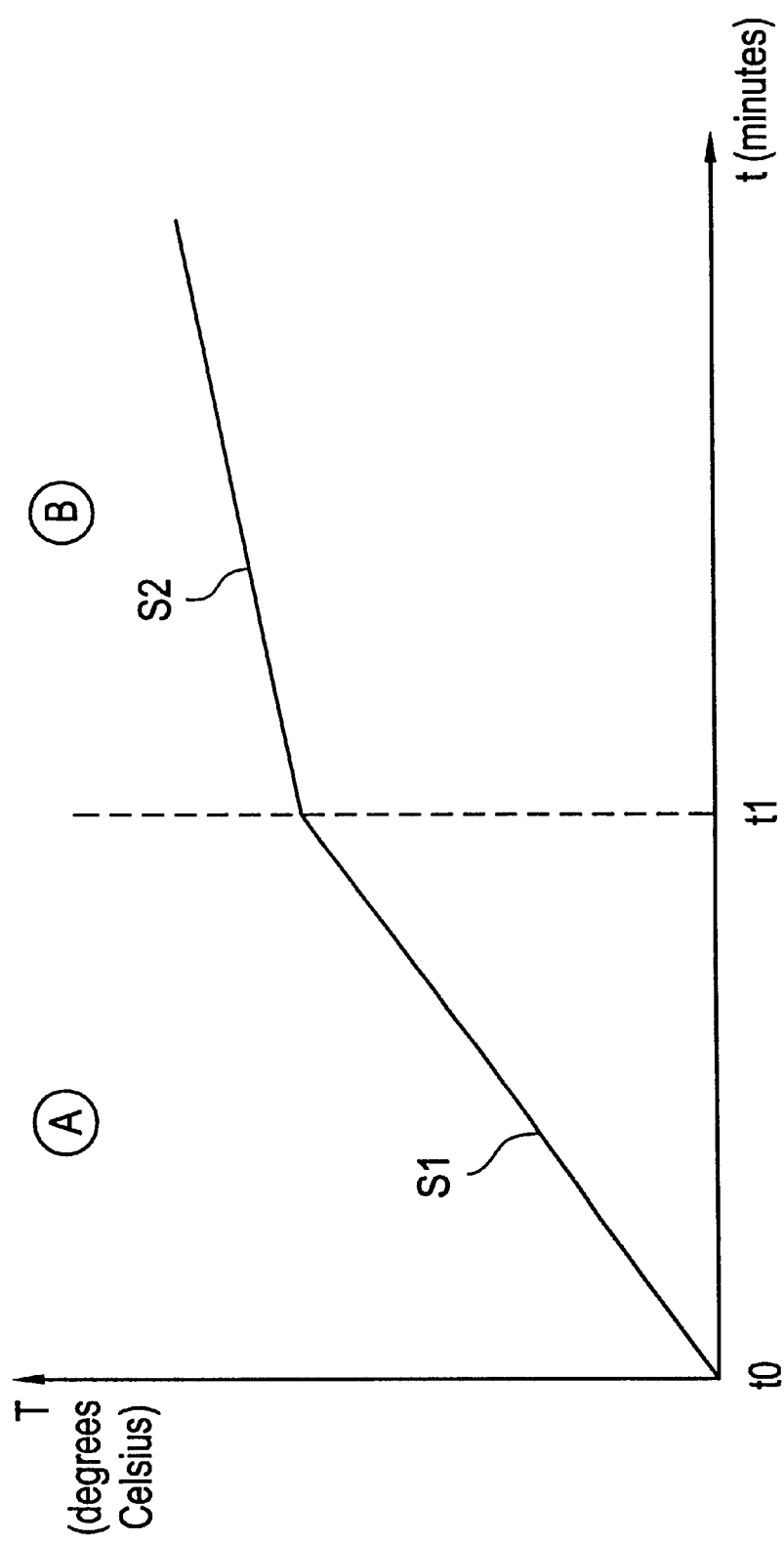

METHOD OF CHARGING A BATTERY

CROSS-REFERENCE TO RELATED APPLICATIONS

This application is based on French Patent Application No. 00 11 116 filed Aug. 31, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of charging an integrated nickel/metal hydride or nickel/cadmium battery when the end of charging is determined by its temperature variation.

The invention finds one particularly advantageous application in the field of radiocommunication terminals, as shown in FIG. 1.

2. Description of the Prior Art

FIG. 1 shows a conventional radiocommunication terminal 1 essentially comprising a receive antenna 2, a screen 3, a navigation key 4 and a keypad 5. The terminal 1 further comprises an integral battery 6 and a connector 7 for connecting the battery 6 to a battery charger 8. The battery charger 8 is designed to be connected to a mains socket outlet 9. The terminal 1 finally comprises a printed circuit IMP that accommodates all of the circuits of the radiocommunication terminal. A device 10 for measuring the temperature of the battery 6 is disposed inside the battery.

The battery 6 is a nickel/metal hydride or nickel/cadmium battery.

The end of charging of nickel/metal hydride or nickel/cadmium batteries is detected by measuring the thermal slope representative of the evolution of the temperature of the battery as a function of time, which is typically of the order of a few degrees Celsius per minute. In fact, the end of charging of this type of battery is related to the temperature of the cells constituting them. Accordingly, when the battery reaches the end of charging, the temperature of the cells constituting the battery increases and charging is stopped. For implementing all the operations for detecting the end of charging, the radiocommunication terminal 1 includes a charging device, which is shown in FIG. 2. This is known in the art.

FIG. 2 shows a charging device 11 of the radiocommunication terminal 1, as used in the prior art. The charging device 11 includes the charger 8 which has two input terminals connected to the mains 12 via the plug 9. Two output terminals of the charger 8 are connected to the battery 6 via a charging switch 13. The charging device further includes a microprocessor 14 connected to the device 10 for measuring the battery temperature in order to command closing or opening of the charging switch 13 to start or stop charging the battery. The device 10 for measuring the battery temperature is advantageously disposed inside the battery.

The charger 8 has the two-fold function of rectification and filtering in order to produce the appropriate current and voltage for charging the battery 6 from the mains power supply 12.

The temperature measuring device 10 measures the battery temperature. Accordingly, from information on the battery temperature supplied by the measuring device 10, the microprocessor 14 calculates the thermal slope of the battery, which is representative of the evolution of the temperature of the battery as a function of time. If the temperature of the cells constituting the battery increases, the microprocessor commands closing or opening of the charging switch to start or stop charging the battery.

Advances in mobile telephone technology are reflected in an increasing component integration density, and there is a trend towards a significant reduction in the size of handsets.

With very small handsets, the battery is very close to the components and consequently the thermal sensor intended to measure the evolution of the temperature associated with charging the battery is influenced by the power dissipation of the components around the battery. Their power dissipation increases the ambient temperature, i.e. the external temperature of the battery, which has repercussions on measurement of the battery temperature: the battery temperature increases without this always reflecting the end of charging of the battery. Accordingly, the influence of the battery's environment can cause an erroneous end of charge condition to be detected, and consequently lead to defective charging of the battery.

The patent document U.S. Pat. No. 5,627,451 describes a method of circumventing the influence of ambient temperature and therefore of preventing erroneous detection of the end of battery charging. To manage the problem of the environment interfering with measuring the battery temperature, the method according to the aforementioned patent also entails measuring the battery voltage. The above method of controlling the charging of a battery consists of measuring, during charging, the variation $\Delta V/\Delta t$ of the battery voltage as a function of time and the variation $\Delta T/\Delta t$ of the battery temperature as a function of time. If a significant slope in the evolution of the battery temperature as a function of time is detected during charging but no change in the value $\Delta V/\Delta t$ is detected, the charging of the battery of continued until the variation $\Delta V/\Delta t$ of the voltage as a function of time and the variation $\Delta T/\Delta t$ of the temperature of the battery as a function of time are at least greater than a predetermined variation of the battery voltage per unit time and a predetermined variation of the battery temperature per unit time, respectively.

The above method therefore entails using a first device to measure the battery voltage and a second device to measure the battery temperature. This solution also necessitates very accurate measurements in the case of nickel/metal hydride batteries. In fact, for nickel/metal hydride batteries the variations in the voltage as a function of time are very small and it is then difficult to detect a voltage slope. This two-fold necessity makes the method according to the patent previously cited costly.

Other methods use a first temperature sensor to detect variations in the ambient temperature and a second temperature sensor to detect variations in temperature associated only with charging the battery. The battery charging temperature is then corrected to take into account modifications due to the environment of the battery.

This type of method still has the disadvantage of requiring two measurement sensors, one of which is outside the battery.

Accordingly, the technical problem to be solved by the present invention is to alleviate the drawbacks of the prior art by providing a simple, low-cost method of thermally detecting the end of charging of a nickel/metal hydride or nickel/cadmium battery that reduces the influence of the environment of the battery and is reflected in control of the evolution of the temperature of the battery as a function of time during charging.

To this end, the solution to the stated technical problem in accordance with the present invention consists of using a single temperature sensor inside the battery to measure the variations in the temperature of the battery as a function of time during charging the battery. The function of the thermal sensor is to detect a first slope of value (X+Y) degrees Celsius per minute due to the power dissipation of the components around the battery and to the increase in the temperature of the battery cells and then to detect a second slope of value Y degrees Celsius in the evolution of the temperature of the battery as a function of time due only to an increase in the temperature of the battery cells signifying the end of charging.

Accordingly, the power dissipation of the components is taken into account by detecting a slope of value equal to X degrees Celsius per minute and the heating of the battery signifying the end of charging is taken into account by detecting a slope of value equal to Y degrees Celsius per minute. The slope values X and Y can be varied and are dependent on the type of radiocommunication terminal used and on the type of battery used. Nevertheless, they are typically within a range of values from a few tenths of a degree Celsius per minute to a few degrees Celsius per minute. The value X can be equal to 0.5° C./minute and the value Y can be equal to 1° C./minute, for example.

SUMMARY OF THE INVENTION

The invention therefore provides a method of charging a battery in which the end of charging is determined by detecting variations in the battery temperature, the method including the following steps:

a) entering a charging mode, b) periodically measuring the battery temperature, c) measuring the variation in the battery temperature per unit time, d) comparing the battery temperature variation per unit time:

d1) to a first threshold corresponding to variation of the ambient temperature and the battery temperature, and in this case:

terminating the charging mode, and d2) to variation of only the ambient temperature, and in this case:

comparing the battery temperature variation per unit time to a second threshold corresponding to variation of only the battery temperature, and terminating the charging mode.

The invention also provides a radiocommunication terminal including a printed circuit and a charging device, which charging device includes a battery charger connected to a mains electrical power supply via a connector, to a battery via a charging switch, and to a microprocessor adapted to command the charging switch and connected to a temperature measuring device, in which terminal the microprocessor is adapted to implement the above method.

Other features and advantages of the invention will become more clearly apparent on reading the following description of one particular embodiment with reference to the accompanying drawings, which description is given by way of non-limiting example only.

BRIEF DESCRIPTION OF THE DRAWINGS

FIG. 3 shows the steps of a method according to the invention.

FIG. 4 is a curve representative of the evolution of the battery temperature as a function of time that illustrates the double slope detection principle of the invention.

DETAILED DESCRIPTION OF THE PREFERRED EMBODIMENT

Figure 1:
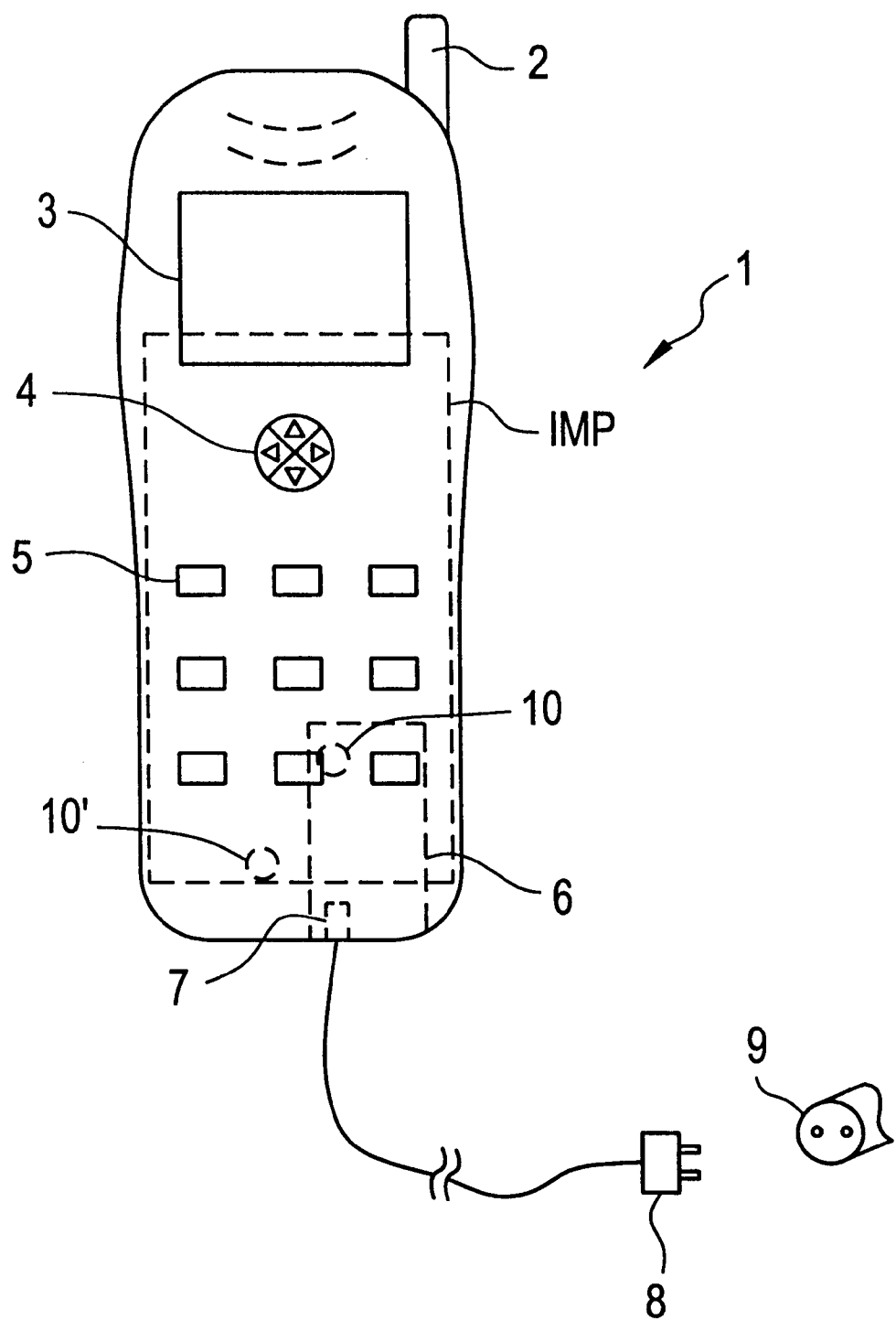
FIG. 1, already described in the above introductory remarks, shows a conventional radiocommunication terminal.

Thus FIG. 3 shows the steps E1, E2, E3, E4 and E5 of the method according to the invention and how they are chained.

A first step E1 of the method consists of entering a charging mode. In the charging mode, the battery receives the specified current for charging the battery via a battery charger connected to a mains socket outlet, for example. The charging mode begins after validating that the battery is in a condition to be charged, i.e. is in the correct range of temperature and voltage.

A second step E2 consists of periodically measuring the battery temperature. To this end, a temperature measuring device disposed inside the battery periodically measures the temperature of the battery. The temperature measuring device can be a negative temperature coefficient variable resistor, for example, i.e. a resistor whose resistance decreases as the temperature increases. Other types of thermal sensor can of course be used without changing the nature of the invention. The time interval between two measurements of the battery temperature is advantageously of the order of 10 seconds. The measuring device therefore measures the temperature of the battery every 10 seconds. Nevertheless, the battery temperature can be measured more frequently, to obtain improved accuracy.

A third step E3 is a first step of detecting the slope of the variation of the battery temperature as a function of time, and allows for variations in the ambient temperature.

This step E3 monitors the variation of the battery temperature per unit time. During this step, the aim is to detect a slope with a value of X+Y degrees Celsius per minute, signifying that the battery is charged. The value of this slope depends on the increase in the ambient temperature, with the value X degrees Celsius per minute, and on the increase in only the battery temperature, with the value Y degrees Celsius per minute. When this slope is detected, charging is stopped.

If a slope of value X degrees Celsius per minute is detected, the battery is considered not to be charged because that slope reflects only the increase in ambient temperature. Charging is then continued. The detection process of step E3 is deployed over a sufficient time period to consider that heating of the environment of the battery has stabilized. That time period depends on the type of radiocommunication terminal used.

Step E3 therefore monitors the variation in the battery temperature per unit time until that variation reaches a first threshold, corresponding to:

variations in the ambient temperature and the battery temperature, in which case the end of charging is deemed to have been detected, and variations in only the ambient temperature, in which case the end of charging is deemed not to have been detected.

If the end of charging is detected during this step, in other words if the slope of X+Y degrees Celsius per minute is detected, the charging mode is terminated directly in step E5. On the other hand, if the battery is not charged and an increase in only the ambient temperature has been detected, that is to say a slope of value X degrees Celsius per minute has been detected, the process moves on to the next step, which is step E4, after a sufficient time period to consider that heating of the environment of the battery has stabilized.

The detection threshold of step E3 can be adapted to take account of the possibility of the radiocommunication terminal entering a call mode during battery charging. Indeed, if the telephone enters the call mode, the power dissipation of the components increases and the ambient temperature increases significantly, thus interfering more with measuring the battery temperature. In this case, the detection threshold for the first slope is set at a higher value, in other words the slope value X representative of the power dissipation of the components is increased.

When heating of the components has stabilized, if the end of charging has not yet been detected, a fourth step E4 constitutes a second step of detecting the slope of the variation in the battery temperature as a function of time. During this step, the aim is to detect a lower slope, of the order of Y degrees Celsius per minute, reflecting the increase in only the battery temperature, independently of the influence of its environment. In fact, thanks to the first detection step E3, heating of the components is now stabilized. This second detection step is therefore more accurate than the preceding detection step because the slope to be detected is smaller.

Step E4 therefore monitors the variation in the battery temperature per unit time until that variation reaches a second threshold, corresponding to variation of only the battery temperature. The second threshold corresponds to a detected slope of Y degrees Celsius per minute. When that threshold is reached, the battery is considered to be optimally charged. The end of charging of the battery is therefore really detected during step E4.

Note that the first and second end of charge detection thresholds described above, i.e. the values of X and Y, can be varied as a function of the type of battery used and also as a function of the type of radiocommunication terminal used. In fact, the type of radiocommunication terminal used defines the environment of the battery.

Finally, a last step E5 consists of issuing the instruction to stop charging. The charging mode is terminated when the second detection of the slope of the variation of the battery temperature as a function of time has been effected, or at the end of step E3 if the latter has detected that the battery is charged.

The steps of the method described above are intended to be implemented by the microprocessor 14 of the charging device 11 of the radiocommunication terminal 1 described with reference to FIGS. 1 and 2.

The method according to the invention therefore improves thermal detection of the end of charging of the battery, so avoiding erroneous detection of the end of charging, thanks to the double slope detection principle explained above.

That principle is shown in FIG. 4, which is a graph representing the evolution of the battery temperature T as a function of time t. The time t in minutes is plotted on the abscissa axis and the temperature T in degrees Celsius is plotted on the ordinate axis. The graph has two separate parts A and B. The first part A is a curve S1 between times t0 and t1 and the second part B is a curve S2 beginning at time t1.

At time to, the radiocommunication terminal enters the charging mode. The first part A of the graph shows the step E3 of the method previously described with reference to FIG. 3. The curve S1 has a slope value of X+Y degrees Celsius per minute which allows for the power dissipation of the components and for the heating of the battery itself, in the situation where the battery is being charged and charging is then stopped. If the battery is not being charged, the slope of the curve S1 is less steep, with a value equal to X degrees Celsius per minute, and is representative only of the increase in the ambient temperature, and the process to detect the end of charging then continues. The curve S1 therefore corresponds to the first threshold for detecting the end of charging of the battery in the case of a charged battery.

Part B of the graph shows the step E4 of the method according to the invention previously described with reference to FIG. 3. The curve S2 has a slope whose value is equal to Y degrees Celsius per minute that takes account of the increase only in the temperature of the battery, the ambient temperature having stabilized. The slope of the curve S2 is therefore less steep than that of the curve S1. The curve S2 corresponds to a second end of battery charging detection threshold, corresponding to the slope value of Y degrees Celsius per minute. The process that detects the second threshold S2 begins after a time period t1 at the end of which heating of the components has stabilized. This time period t1 depends on the type of radiocommunication terminal used and in most cases is about 10 minutes.

Because the power dissipation of the components around the battery has been taken into account by detecting the first slope, interference with measuring the battery temperature is no longer a problem. Thus the method according to the invention optimizes the design of radiocommunication terminal.

Figure 2:
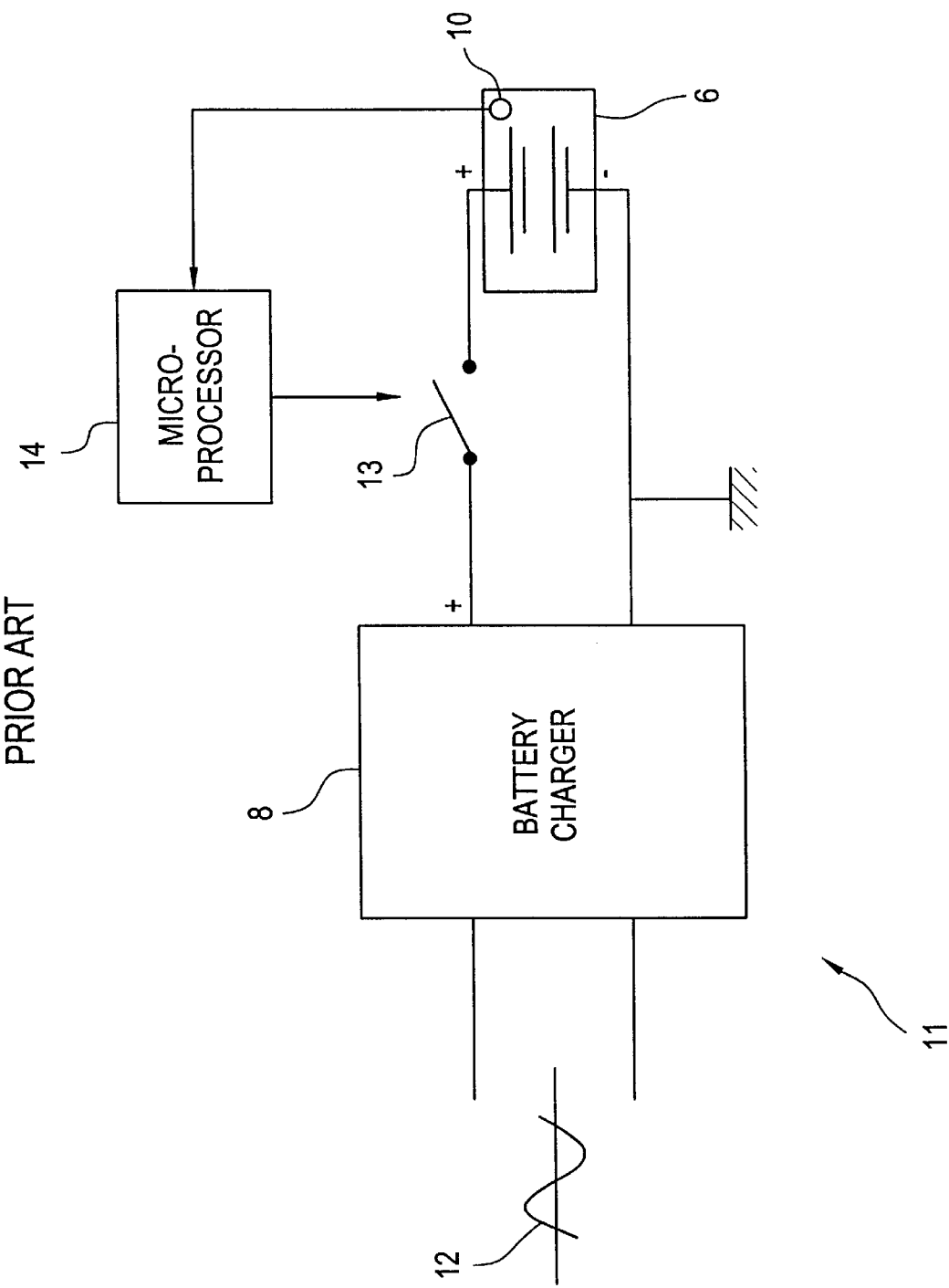
FIG. 2, also described already in the above introductory remarks, shows a battery charging device used in a manner known in the art in the radiocommunication terminal shown in FIG. 1.

As shown in FIG. 1, in another embodiment of the invention, a device 10' for measuring the battery temperature, equivalent to the measuring device 10 already described, can be disposed directly on the printed circuit IMP of the radiocommunication terminal 1, instead of being disposed inside the battery 6. Detection of the first slope, taking into account the heating of the environment of the battery, allows this, even if the temperature measuring device 10' is then closer to the components than if it is inside the battery 6.

There is claimed:

1. A method of charging a battery in which the end of charging is determined by detecting variations in the battery temperature, said method including the following steps:
   a) entering a charging mode,
   b) periodically measuring said battery temperature,
   c) measuring the variation in said battery temperature per unit time,
   d) comparing said battery temperature variation per unit time:
   d1) to a first threshold corresponding to variation of the ambient temperature and the battery temperature, and in this case:
      terminating said charging mode, and
   d2) to variation of only the ambient temperature, and in this case:
      comparing said battery temperature variation per unit time to a second threshold corresponding to variation of only the battery temperature, and
      terminating said charging mode.

2. The method claimed in claim 1 wherein said first and second thresholds can be varied as a function of the type of battery used and as a function of the environment of said battery.

3. The method claimed in claim 1 wherein said step d1) is implemented over a period of time sufficient to consider said ambient temperature to have stabilized.

4. The method claimed in claim 1 wherein said step b) consists of effecting at least one measurement of said battery temperature every 10 seconds.

5. A radiocommunication terminal including a printed circuit and a charging device, which charging device includes a battery charger connected to a mains electrical power supply via a connector, to a battery via a charging switch, and to a microprocessor adapted to command said charging switch and connected to a temperature measuring device, in which terminal said microprocessor is adapted to implement the method claimed in claim 1.

6. The radiocommunication terminal claimed in claim 5 wherein said temperature measuring device comprises a negative temperature coefficient variable resistor.

7. The radiocommunication terminal claimed in claim 5 wherein said temperature measuring device is disposed inside said battery.

8. The radiocommunication terminal claimed in claim 5 wherein said temperature measuring device is disposed directly on a printed circuit of said radiocommunication terminal.

* * * * *